3,470,021

MAGNETIC RECORDING MATERIAL

Serge Hendricx and François Pierre Loots, Mortsel-Antwerp, Belgium, assignors to Gevaert Photo-Producten N.V., Mortsel, Belgium, a Belgian company No Drawing. Filed Apr. 25, 1966, Ser. No. 544,691

Int. Cl. G11b *5/68*

U.S. Cl. 117—239 10 Claims

ABSTRACT OF THE DISCLOSURE

A high speed magnetic recording material, e.g. tape, formed of a magnetic recording layer carried on a magnetically inert support, the recording layer containing as essential constituents magnetically susceptible particles, a synthetic polymeric binder, and oleic acid in the amount of 3–10% by weight of said particles, binder and acid, and characterized by improved resistance to abrasion and lump formation.

The present invention relates to an improved magnetic recording material for use in high speed recording, i.e. as data storage means in computers or as video tape in video recorders. Such a magnetic recording material must withstand the intensive friction resulting from numerous high speed travels or passes in contact with recording and reading heads, guide rollers and drive capstans. This friction causes lumps of redeposited debris of the magnetic recording layer to become attached to the surface of the recording material and/or to the heads whereby drop-out errors arise, which must at all event be avoided in electronic data processing i.e. in digital recording. In video recording, in slant track video recording as well as in transverse video recording, lump formation and abrasion are particularly important in the reproduction of an individual picture for a rather long time and they rapidly cause complete video failure.

It is an object of the present invention to provide a magnetic recording material for use in high speed recording with a considerably improved resistance to lump formation and abrasion.

This object has been accomplished by incorporating oleic acid into the magnetic recording layer of a magnetic recording material for use in high speed recording, in a concentration ranging from 3 to 10 percent by weight calculated on the total weight of binder, magnetically susceptible particles and oleic acid all together. Lower concentrations cannot sufficiently produce the same favourable effect of the present invention.

The magnetic recording material according to the invention is very resistant to lump formation and abrasion and is especially suitable for the reproduction of an individual picture for a rather long examination time in slant track or in transverse video recording. The oleic acid is not only a very good lubricant for the magnetic recording material, but it also considerably improves the plasticity of the magnetically susceptible layer and prevents the latter from becoming brittle on aging.

The carboxylic acid group of the oleic acid has a greater affinity for the magnetically susceptible particles than for the binder and the other ingredients of the magnetic recording layer and consequently it is oriented towards the surface of these particles. The fatty or oleophilic part of the oleic acid, however, tends to turn away from the particles and in this way brings about an excellent lubrication, whereby the resistance of the magnetic recording material according to the present invention to lump formation and abrasion is considerably improved.

The oleic acid can be incorporated into the magnetic recording layer directly i.e. by adding it to the coating composition, from which this layer is applied. However, the oleic acid can also be added to the coating composition of another layer at the same side of the support of the recording material or be applied without any binder to the recording layer by an after treatment. In the latter two cases the oleic acid diffuses to the recording layer and must be applied in such an amount that the final amount present in the recording layer comes within the above-mentioned range.

For the preparation of the magnetic recording layer one can proceed according to all usual methods. According to a very suitable technique the powdered magnetic material, a dispersing agent therefor, and part of the binder for the magnetic recording layer are mixed, e.g. in a ball-mill, in a suitable solvent for said binder. Then a solution of the remaining binder in a suitable solvent and the oleic acid are added and the whole is mixed again in the ball-mill. However, the oleic acid can also be added during the first step of the preparation. The coarse particles left after grinding are removed and the composition is deaerated before coating it on a support in a common layer thickness of approximately 3 to 30$\mu$. The total solid substance of the magnetic recording layer preferably consists of 5 to 75% by weight of binder. In some cases curing is applied for improving the wear resistance and calendering for improving the smoothness of the coating and the packing density of the magnetic material.

Suitable binders for the magnetic recording layer are poly(vinyl chloride, poly(vinyl acetate), poly(acrylates), e.g. poly(butylacrylate), and particularly copolymers of at least two of the following recurring monomeric units: vinyl alcohol, vinyl acetate, vinyl butyral, vinyl chloride, vinylidene chloride and acrylonitrile, diffierent classes of polyurethans, and polyesters or polyesteramides modified with isocyanate. The binder has a more or less flexible character depending on the use for which the recording material is intended. Consequently, elastomers, which can be hardened to some extent, e.g. some of the above-mentioned polyurethans and polyesters or polyesteramides modified with isocyanate, are useful for constituting at least part of the total binder. Two or more binders can also be utilised together.

As solvents for the binder of the magnetic recording layer are customarily used organic liquids. Suitable solvents are i.a. esters such as ethyl acetate and butyl acetate, ketones, and aliphatic chlorinated hydrocarbons such as 1,2-dichloroethane.

All kinds of usual magnetic particles may be used in the recording material of the invention, for example magnetically susceptible iron (III) oxide particles, magnetite, mixed ferrites and alloys of iron, nickel and cobalt. The preferred particles are of the oxide type, have an elongated or acicular shape e.g. acicular $\gamma$-$Fe_2O_3$, and are preferably 0.2 to 2.0 micron in length and 0.02 to 0.6 micron in width.

Flexible as well as rigid bases can be used as supports for the magnetic recording layer. The support may have any geometrical form e.g. it may be a disc, drum or tape, and may be made of any convenient material such as glass, plastic, or metal. A preferred support material is made of oriented poly(ethylene terephthalate) film. Other suitable supports are made of paper, cellulose triacetate, and oriented poly(vinyl chloride). The support may have any thickness depending on the use, for which the recording material is intended. However, for a flexible support, the thickness normally ranges between approximately 0.005 and approximately 0.14 mm. Further, the base may be of any width and of any length dependent on the purpose for which the recording material is intended. For most purposes the width varies between approximately 6 and 50 mm. The support is often provided with a subbing layer before the recording layer comprising the magnetic particles is applied. At the rear side of the recording material one or more backing layers e.g. a pigment layer, an antistatic layer etc. can be applied.

The following specific examples illustrate the present invention without, however, limiting it thereto.

Example 1

A mixture comprising the following ingredients is ground in a ball-mill for 48 hours (the parts referred to in the present and in the following examples are parts by weight):

10 parts of needle-shaped $\gamma$-$Fe_2O_3$, 0.2 part of soybean lecithin, 1 part of partially hydrolyzed copoly(vinyl chloride/vinyl acetate) comprising 2.3% by weight of free hydroxyl groups and 3% by weight of vinyl acetate groups, 2.6 parts of ethyl acetate, 7.9 parts of n-butyl acetate.

A solution of 1.8 parts of the above-mentioned copolymer in 7.6 parts of ethyl acetate and 0.68 part of dimethylglycol phthalate is added to said mixture and grinding is continued for 24 hours.

The resulting dispersion is filtered and applied to an oriented poly(ethylene terephthalate) support having a thickness of 20$\mu$, in such a way that upon drying a magnetic recording layer is obtained having a uniform thickness of 11$\mu$. In order to acquire a smooth surface the resulting material is hot-calendered.

The magnetic material thus obtained is not suited for use in high speed recording because the magnetic recording layer is not sufficiently resistant to lump formation and abrasion at high speed travels or passes in contact with recording and reading heads, guide rollers, etc. When used as video tape, the magnetic material is not suited for the reproduction of an indivdual picture for a rather long time, since in the case of stop-motion a complete video failure is almost immediately caused owing to drop-outs brought about by lump formation and abrasion.

A second magnetic material is prepared in the same manner, with the proviso however that the dimethylglycol phthalate is replaced by the same amount of oleic acid. The magnetic material thus obtained is very resistant to lump formation and abrasion and accordingly very suited for use in high speed recording. When used as video tape, the tape can be stopped for more than 1 hour for reproducing an individual picture, without failure of the image in consequence of drop-outs caused by lump formation and abrasion.

Example 2

A mixture comprising the following ingredients is ground in a ball-mill for 48 hours:

10 parts of needle-shaped $\gamma$-$Fe_2O_3$, 0.2 part of monobutyl phosphate, 1.25 parts of partially hydrolyzed copoly(vinyl chloride/vinyl acetate) comprising 2.3% by weight of free hydroxyl groups and 3% by weight of vinyl acetate groups, 20 parts of 1,2-dichloroethane.

The following products are added to this mixture:

1.05 parts of polyesteramide modified with polyisocyanate resulting from the reaction of 4 parts of hexamethylene diisocyanate with 100 parts of a polyesteramide, prepared by condensing 7.5 moles of ethylene glycol, 9 moles of adipic acid and 1.5 mole of ethanolamine, 12.5 parts of 1,2-dichloroethane.

Grinding is continued for 24 hours. Subsequently a mixture of 0.6 part of a 7.5% solution of the reaction product of 1 mole of 1,3,6-hexanetriol and 3 moles of hexamethylenediisocyanate in 1,2-dichloroethane is added.

The resulting dispersion is filtered and applied to an oriented poly(ethylene terephthalate) support with a thickness of 20$\mu$ in such a way that upon drying a magnetic recording layer having a uniform thickness of 11$\mu$ is obtained. The resulting material is hot-calendered before the binder of the magnetic recording layer is cross-linked.

The magnetic tape thus obtained is very suited for use in transverse and slant track video recording but its stop-motion durability is very poor, i.e. when stopping the tape for the reproduction of an individual picture a complete video failure is almost immediately caused as a result of drop-outs brought about by lump formation and abrasion.

A second magnetic material is prepared in the same manner, but after the first grinding 0.68 part of oleic acid are added also to the mixture. The magnetic material thus obtained is very resistant to lump formation and abrasion and accordingly very suited for use in high speed recording. When used as video tape, the tape can be stopped for more than 1 hour for reproducing an individual picture, without failure or alteration of the image owing to drop-outs caused by lump formation and abrasion.

Example 3

Example 2 is repeated, with the provisio however, that before the application of the magnetic dispersion to the oriented poly(ethylene terephthalate) support, a subbing layer is applied thereto from the following coating composition pro rata of 40 sq. m./l.:

| | | |
|---|---|---|
| Copoly(vinylidene chloride/acrylonitrile) a 20% solution of which in acetone has a viscosity of 200 cp. at 24° C. | g | 2.5 |
| Ethyl acetate | cc | 50 |
| Acetone | cc | 50 |

The advantages of the magnetic tape comprising oleic acid are the same as described in Example 2.

Example 4

Example 2 is repeated, with the proviso, however, that instead of adding the oleic acid to the coating dispersion for the magnetic recording layer, it is applied afterwards by meniscus coating from a solution of 7.5 parts by weight of oleic acid in 100 parts by weight of toluene in such a ratio that upon hot calendering 7% by weight of oleic acid calculated on the total weight of binder, magnetically susceptible particles, and oleic acid all together, is present in the magnetic recording layer.

The advantages of the magnetic tape comprising oleic acid are the same as those described in Example 2.

What we claim is:

1. Magnetic recording material for use in high speed recording, comprising a magnetically inert support and a solid, smooth, wear-resistant magnetic recording layer applied thereto, this layer consisting essentially of magnetically susceptible particles, a synthetic polymeric binder and oleic acid, said oleic acid being present in a concentration ranging from 3 to 10% by weight calculated on the total weight of binder, magnetically susceptible particles, and oleic acid all together.

2. Magnetic recording material according to claim 1, wherein the support is a flexible support.

3. Magnetic recording material according to claim 2, wherein the flexible support is an oriented poly(ethylene terephthalate) support.

4. Magnetic recording material according to claim 1, wherein the binder of the recording layer at least partially consists of a copolymer of at least two recurring monomeric units selected from the group consisting of: vinyl alcohol, vinyl acetate, vinyl butyral, vinyl chloride, vinylidene chloride and acrylonitrile.

5. Magnetic recording material according to claim 1, wherein the binder of the recording layer at least partially consists of an elastomer.

6. Magnetic recording material according to claim 5, wherein the elastomer is selected from the classes of polyurethans and polyesters and polyesteramides modified with isocyanate.

7. Magnetic recording material according to claim 1, wherein a subbing layer is provided between the magnetic recording layer and the support.

8. Magnetic recording material according to claim 1, wherein the magnetically susceptible particles are magnetically susceptible iron(III) oxide particles.

9. Magnetic recording material according to claim 8, wherein the magnetically susceptible iron(III) oxide particles are $\gamma$-$Fe_2O_3$ particles.

10. Magnetic recording material according to claim 1, wherein the oleic acid is incorporated into the magnetic recording layer by diffusion, after having been applied on top thereof.

References Cited

UNITED STATES PATENTS

| | | | |
|---|---|---|---|
| 2,106,882 | 2/1938 | Betz | 252—62.54 X |
| 2,654,681 | 10/1953 | Lueck | 117—239 |
| 3,029,157 | 4/1962 | Sutheim et al. | 252—62.54 X |
| 3,042,639 | 7/1962 | Adams et al. | 117—235 |
| 3,072,577 | 1/1963 | Miller | 252—62.53 |
| 3,216,846 | 11/1965 | Hendricx et al. | 117—235 |

FOREIGN PATENTS

| | | |
|---|---|---|
| 580,909 | 8/1959 | Canada. |
| 748,763 | 5/1956 | Great Britain. |

WILLIAM D. MARTIN, Primary Examiner

B. D. PIANALTO, Assistant Examiner

U.S. Cl. X.R.

117—138.8, 235, 237, 240; 252—62.54

PO-1050
(5/69)

UNITED STATES PATENT OFFICE
CERTIFICATE OF CORRECTION

Patent No. 3,470,021 Dated September 30, 1969

Inventor(s) Serge Hendricx and Francois Pierre Loots

It is certified that error appears in the above-identified patent and that said Letters Patent are hereby corrected as shown below:

In the heading to the printed specification, lines 4 and 5, for "assignors to Gevaert Photo-Producten N.V." read -- assignors to Gevaert-Agfa, N.V. --.

SIGNED AND
SEALED
FEB 17 1970

(SEAL)
Attest:

Edward M. Fletcher, Jr.
Attesting Officer

WILLIAM E. SCHUYLER, JR.
Commissioner of Patents